(12) United States Patent
Nakatsu

(10) Patent No.: US 7,450,142 B2
(45) Date of Patent: Nov. 11, 2008

(54) SCANNING OPTICAL DEVICE WITH POST-DEFLECTION DIFFRACTION ELEMENT SUPPORTED BY AN END-SIDE SWING MEMBER TO SUPPRESS VIBRATION

(75) Inventor: Haruhiko Nakatsu, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 209 days.

(21) Appl. No.: 11/514,195

(22) Filed: Sep. 1, 2006

(65) Prior Publication Data

US 2007/0053042 A1 Mar. 8, 2007

(30) Foreign Application Priority Data

Sep. 2, 2005 (JP) ............. 2005-254272

(51) Int. Cl.
*B41J 15/14* (2006.01)
*G02B 26/08* (2006.01)

(52) U.S. Cl. ........................ 347/242; 359/205

(58) Field of Classification Search ............. 359/196, 359/204–208, 216–219; 347/242–245, 259–261
See application file for complete search history.

(56) References Cited

U.S. PATENT DOCUMENTS

2001/0030792 A1* 10/2001 Kimura ............... 359/212
2004/0036936 A1* 2/2004 Nakajima et al. ............ 359/204
2006/0262373 A1* 11/2006 Oda et al. .................. 359/205

FOREIGN PATENT DOCUMENTS

| JP | 2000-147405 | 5/2000 |
|----|-------------|--------|
| JP | 2002-148541 | 5/2002 |
| JP | 2004-101906 | 4/2004 |
| JP | 2004205938 A * | 7/2004 |

* cited by examiner

*Primary Examiner*—Alessandro Amari
*Assistant Examiner*—Jennifer L Doak
(74) *Attorney, Agent, or Firm*—Fitzpatrick, Cella, Harper & Scinto

(57) ABSTRACT

In a scanning optical device which deflects a light flux from a light source with a deflection scanning unit to perform light scanning to a body to be scanned through at least one optical member, the scanning optical device is characterized by including a holding member 29, a position adjusting unit, and an abutting unit. The holding member 29 which is swingable holds a diffraction optical element 23 which is of at least one of the optical member. The position adjusting unit swings the holding member 29 to adjust an attitude of the diffraction optical element 23 held by the holding member 29. The abutting unit has a viscoelastic member 33a which abuts on the holding member 29.

9 Claims, 19 Drawing Sheets

SCANNING OPTICAL DEVICE WITH POST-DEFLECTION DIFFRACTION ELEMENT SUPPORTED BY AN END-SIDE SWING MEMBER TO SUPPRESS VIBRATION

BACKGROUND OF THE INVENTION

1. Field of the Invention

The present invention relates to a scanning optical device which performs light scanning to an exposure material through at least one optical member by using a deflection scanning unit to deflect a light flux from a light source, and an image forming apparatus provided therewith.

2. Description of the Related Art

In the scanning optical device used in the image forming apparatus such as a laser beam printer and a digital copying machine, the light flux which is emitted from a light source unit while optical modulation is performed according to an image signal is periodically deflected by a deflection unit such as a rotating polygon mirror. Then, a latent image is formed by focusing the light flux into a spot on a body to be scanned such as a photosensitive drum and a photosensitive member belt with an image-formation optical element having f-θ characteristics.

Like a full-color image forming apparatus, when the image is formed by superposing toner images based on the plural latent images formed on the plural bodies to be scanned, sometimes a defective image is generated due to color shift. As one of reasons the color shift is generated by a difference in geometric characteristics of the scanning light beams scanned by the plural scanning optical devices, for example, the color shift is generated by scanning line inclination or a difference in bend of the scanning line.

Therefore, in order to cause geometric characteristics of the plural scanning light beams to correspond to one another, there are proposed a scanning optical device having an adjusting unit and an image forming apparatus provided therewith (Japanese Patent Application Laid-Open No. 2002-148541).

FIG. 9 shows a configuration which adjusts the geometric characteristics of the scanning light in the scanning optical device. Referring to FIG. 9, the light flux emitted from a light source unit 300 is focused in line on a deflection plane of a rotating polygon mirror 302 through a cylindrical lens 301 having a predetermined deflection power in a sub-scanning direction. The focused light flux is deflected and reflected by the rotating polygon mirror 302. Then, the light flux passes through a toric lens 303 and a diffraction optical element 304 which is of the optical component, and a surface of a photosensitive drum 305 is irradiated with the light flux. The sign L designates an optical axis which corresponds to a scanning center axis and an optical axis of the toric lens 303.

In the scanning optical device, the light flux is scanned on the surface of the photosensitive drum 305 while inclined as shown by a dotted line H by swinging the diffraction optical element 304 in a direction of an arrow G of FIG. 9A about the optical axis of the diffraction optical element 304.

A swing amount of diffraction optical element 304 is substantially proportional to an inclination amount of scanning line. Therefore, the diffraction optical element 304 is swung by an amount necessary to correct the inclination shift, which allows the inclination of the scanning line to be adjusted.

As shown in FIG. 9B, for the scanning line bend adjustment, similarly the diffraction optical element 304 is swung in a direction of an arrow R about a straight line M orthogonal to the optical axis L, which allows the light flux to be scanned on the surface of the photosensitive drum 305 at an angle as shown by a dotted line J.

A swing amount of diffraction optical element 304 is substantially proportional to a bend amount of scanning line. Therefore, the diffraction optical element 304 is swung by an amount necessary to correct the bend shift, which allows the bend of the scanning line to be adjusted.

There is proposed the following means for realizing the above configuration.

In FIG. 10, an image-formation optical element 101 which is of the optical member is held by a holding member 102. The holding member 102 is supported to support base portions 106 with plate springs 107. A projection piece 102A2 is formed in a part of the holding member 102, and the projection piece 102A2 is secured to a fixed portion of an optical housing (not shown) with an adjusting screw 104. A compression spring 105 into which the adjusting screw 104 is inserted is arranged between a lower surface of the projection piece 102A2 and the fixed portion of the optical housing, and the compression spring 105 presses the holding member 102 upward from beneath. Therefore, the holding member 102 is attached while being swingable in a direction of an arrow β by adjusting the secured state of the adjusting screw 104, and the scanning line bend can be adjusted.

In an output shaft of a drive source 109, a lead screw 109A is formed, and an adjusting lever 112 is moved forward by rotation of the output shaft. The movement of the adjusting lever 112 presses downward a support pin (not shown) provided in the holding member 102, which moves the holding member 102 on the driver source side downward. On the contrary, when the drive source 109 is reversely rotated, the holding member 102 is moved upward. Accordingly, the image-formation optical element 101 is attached while being swingable in a direction of an arrow γ, and the inclination of the scanning line can be adjusted (Japanese Patent Application Laid-Open No. 2004-101906).

In a configuration shown in FIG. 11, a diffraction optical element 206 which is of the optical member is supported by and fixed to a holding member 201 through an auxiliary member 200. The holding member 201 is held by a rotation support portion 203 so as to be swingable with respect to a main body chassis 202. The holding member 201 is attached while being swingable in a direction of an arrow A by an angle adjusting member 204 and a spring 205 which are arranged on both ends of the holding member 201. Accordingly, the angle adjusting member 204 is moved in a horizontal direction to fix the angle adjusting member 204 to the main body chassis 202, which allows the inclination of the scanning line to be adjusted. (Japanese Patent Application Laid-Open No. 2000-147405).

However, in the above conventional techniques, there is the following problem.

In the adjusting configuration shown in FIG. 10, because the swing center during the inclination adjustment is provided in one end portion of the holding member, a distance from the optical axis of the image-formation optical element 101 to the swing center becomes lengthened. Therefore, the bend amount is changed because the light flux incident position is not symmetrically changed on the both sides of the image-formation optical element 101 during the inclination adjustment.

It is assumed that the image-formation optical element 101 has bend amount change characteristics shown in FIG. 6 when the inclination adjustment is performed by the distance between the swing center and the optical axis of the image-formation optical element. In the case where a length of the image-formation optical element 101 is set at about 260 mm, the distance between the swing center and the optical axis of the image-formation optical element becomes about 150 mm when the swing center is arranged outside the image-formation optical element 101. In this case, when the image-formation optical element 101 is inclined by three minutes to perform the inclination adjustment, the changed bend amount becomes about 6.5 μm. As a result, the scanning line is curved on the photosensitive drum. When the inclination adjustment is performed further largely, the bend change amount is increased in proportion to the inclination amount of the image-formation optical element, which results in the generation of the defective image which is of the color shift in the color image forming apparatus.

Therefore, preferably the swing center is set at a substantially central portion of the image-formation optical element, because the curvature of the scanning line can be decreased on the photosensitive drum.

In the adjusting configuration shown in FIG. 11 which is an example of the configuration, one end is fixed by the angle adjusting member 204 while the other end is pressed by the spring. As a result, when vibration is transferred from the main body through the rotation support portion 203 and the angle adjusting member 204, the rotation support portion 203 and angle adjusting member 204 which are fixed to the main body chassis 202 are not vibrated. However, the other end side balances the elastic member in the static state, and the position on the other end side is not fixed when the vibration is applied.

It is desirable that the position of other end side with respect to the position adjusting unit be fixed such that the optical component is not vibrated even if the vibration is applied.

However, when the position of other end side with respect to the position adjusting unit is fixed to prevent the vibration, distortion is generated in the optical component by the fixation of the other end side in performing the position adjustment with the position adjusting unit.

SUMMARY OF THE INVENTION

An object of the invention is to provide a scanning optical device having a configuration, in which the swing center is set at the substantially central portion of the optical unit to be able to decrease the vibration of the optical unit while preventing the distortion of the optical unit even if the position adjustment is performed.

Another object of the invention is to provide a scanning optical device including a rotating polygon mirror which deflects and scans a laser beam; an optical unit which has a diffraction optical component for orienting the laser beam from the rotating polygon mirror toward a body to be scanned; a swing member which acts on one end portion of the optical unit to swing the optical unit in a plane orthogonal to an optical axis of the diffraction optical component while rotation axis is located near the optical axis; a vibration suppression unit which comes into contact with the other end portion of the optical unit to suppress vibration of the optical unit; and a separating unit which separates the vibration suppression unit when the optical unit is swung by the swing member.

Another objects of the invention will become apparent in the following description.

DESCRIPTION OF THE EMBODIMENTS

A scanning optical device and an image forming apparatus according to an embodiment of the invention will be described with reference to the drawings. In this case, a digital full-color copying machine will be described as the image forming apparatus provided with the scanning optical device by way of example.

(Overall Configuration of Image Forming Apparatus)

Figure 1:
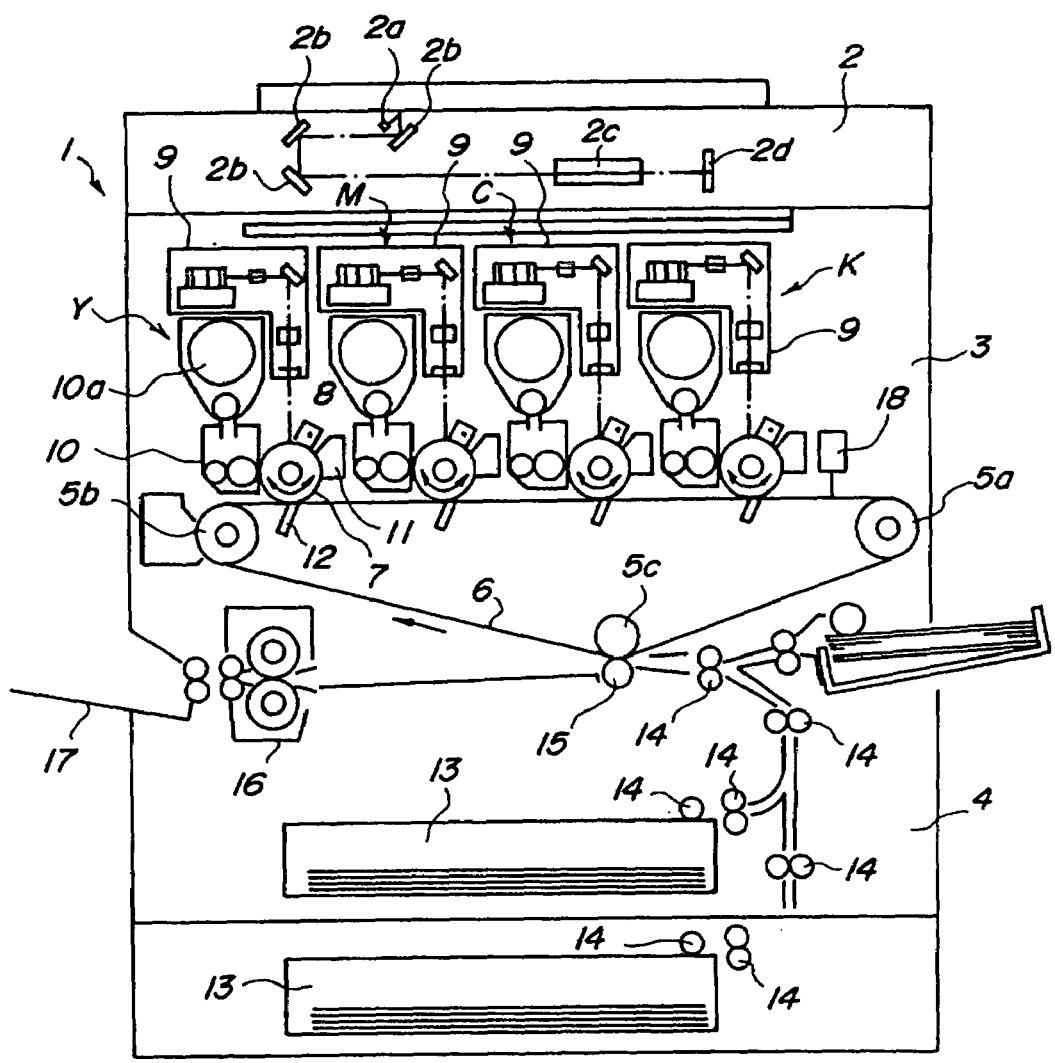
FIG. 1 is an explanatory view showing a schematic overall cross section of an image forming apparatus.

An overall configuration of the image forming apparatus will be described with reference to FIG. 1 along with an image forming operation. FIG. 1 is an explanatory view showing a schematic overall cross section of the image forming apparatus according to the embodiment.

In the image forming apparatus of the embodiment, an image reading unit 2 is arranged in an upper portion of an apparatus main body 1, an image forming unit 3 is arranged in a lower portion of the apparatus main body 1, and a sheet conveyance portion 4 is arranged below the image forming unit 3.

In the image reading unit 2, an original supported on an upper surface of the apparatus is irradiated with the light from a light source 2a, the light reflected from the original is read with a line sensor 2d through a mirror 2b and reading lens 2c, and the light is converted into a digital signal and transmitted to the image forming unit 3.

In the image forming unit 3, four image forming station Y, M, C, and K are arranged in parallel along a rotating direction of an intermediate transfer belt 6. The intermediate transfer belt 6 is entrained about a drive roller 5a, a driven roller 5b, and an inner transfer roller 5c, and the intermediate transfer belt 6 is rotated in an arrow direction. In the image forming stations, color toner images of yellow (Y), magenta (M), cyan (C), black (K) are formed in the order of the rotating direction of the intermediate transfer belt 6. The four image forming stations have the same configuration except that the colors of the formed toner images are different from one another.

The configuration of the image forming station will be described by illustrating the yellow image forming station Y. The photosensitive drum 7 which is of the image bearing member faces the intermediate transfer belt 6. A charger 8, a scanning optical device 9, a development device 10, and a cleaning unit 11 are arranged around the photosensitive drum 7. The cleaning unit 11 removes toner remaining on the photosensitive drum 7. The reference numeral 10a designates a toner supplying device which supplies toner to the development device 10.

In the image formation, the surface of the rotating photosensitive drum 7 is evenly charged with the charger 8, and an electrostatic latent image is formed by irradiating the photosensitive drum 7 with the light from the scanning optical device 9 according to image information. The latent image is made to be a visible image by performing the toner development with the development device 10, and primary transfer of the toner image to the rotating intermediate transfer belt 6 is performed by applying a bias to a primary transfer member 12.

The color image is transferred to the intermediate transfer belt 6 by performing the toner image transfer in the order of the yellow, magenta, cyan, and black colors.

A sheet which is of a recording material is conveyed from the sheet conveyance portion 4 to a secondary transfer portion in synchronization with the image formation. That is, the sheet is conveyed from a cassette 13 loaded in the lower portion of the apparatus to the secondary transfer portion by a conveyance roller 14. In the secondary transfer portion, the toner image on the intermediate transfer belt 6 is transferred to the sheet by applying a bias to an outer secondary-transfer roller 15. The toner image on the sheet is fixed with heat and pressure by a fixing device 16, and the sheet is discharge to a discharge unit 17.

In FIG. 1, the reference numeral 18 designates an image position reading detection unit which detects the position information on the intermediate transfer belt 6. The three image position reading detection units 18 having the same configuration are arranged at three points of a deep side in a width direction, a center, and a front side of the intermediate transfer belt 6.

Before the image forming apparatus performs the image formation, the image of a mark "+" (hereinafter referred to as "registration mark") is formed at a predetermined target position on the intermediate transfer belt 6 in each image forming station, and the image position of the registration mark is read by the image position reading detection unit 18. An image position shift amount of each parameter is detected at the position of the image formed by each image forming station on the intermediate transfer belt 6, and automatic correction is performed with a correction unit.

(Scanning Optical Device)

Figure 2A:
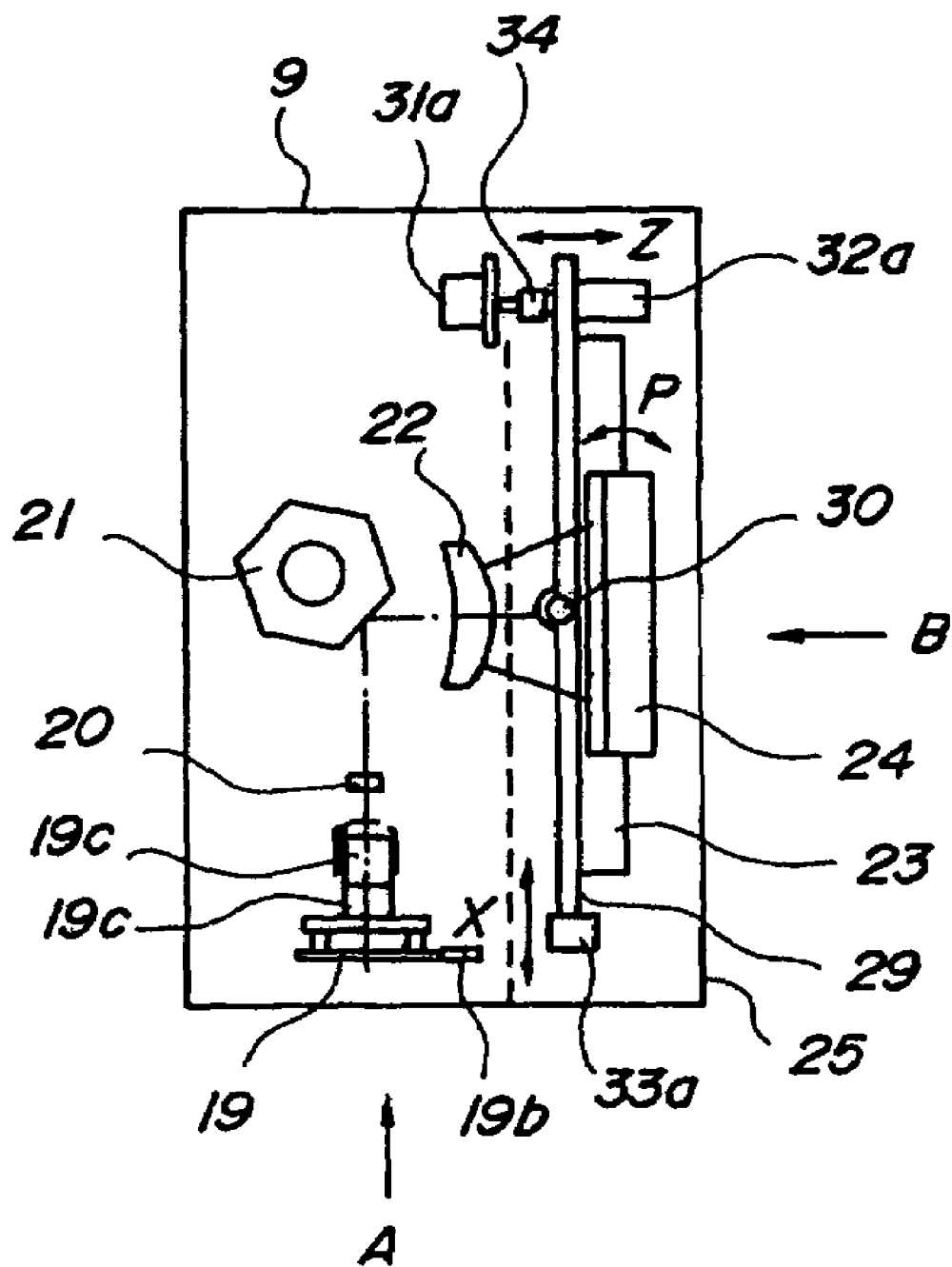
FIGS. 2A to 2C are explanatory views showing a scanning optical device.
Figure 2B:
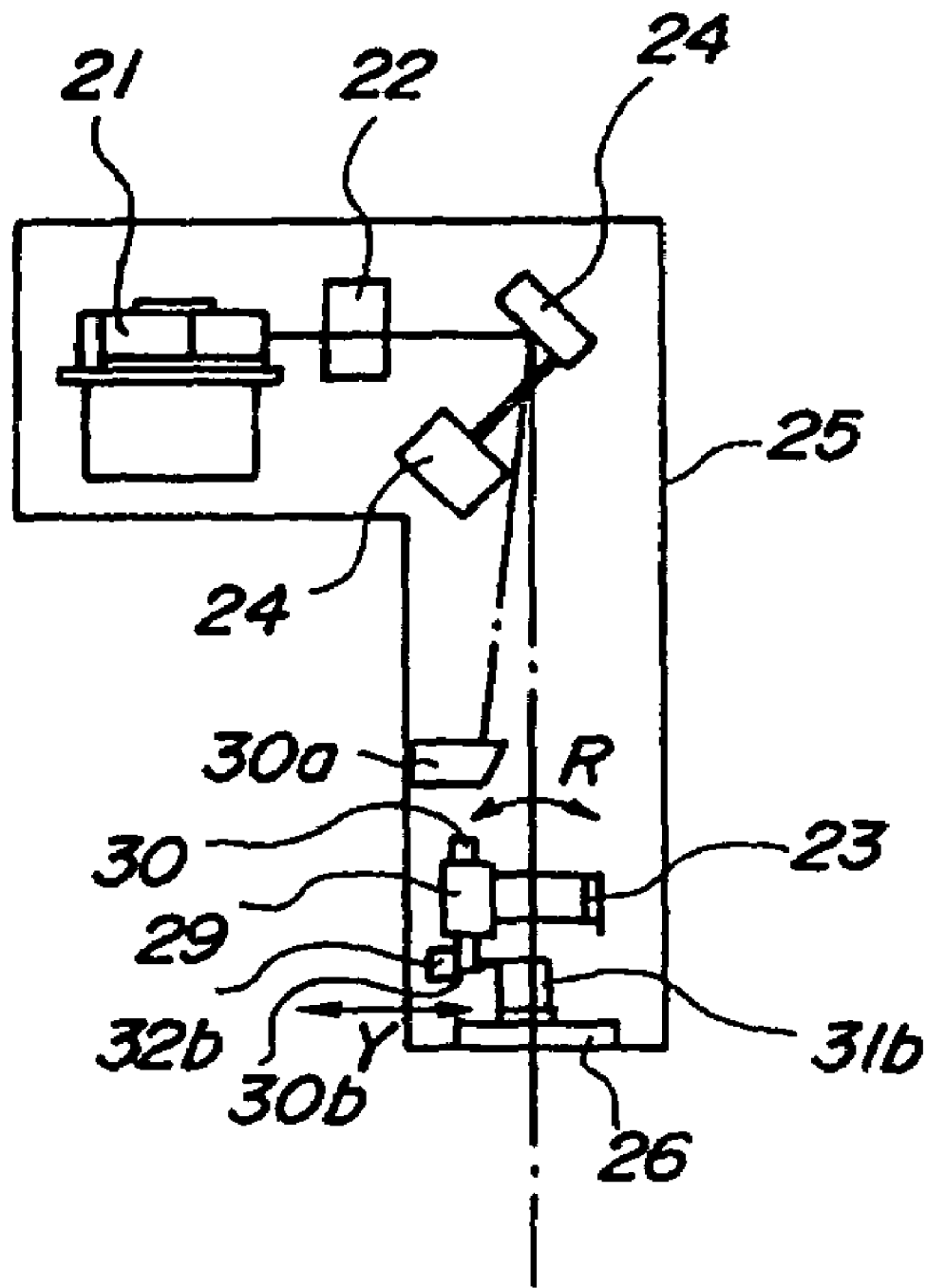
Figure 2C:
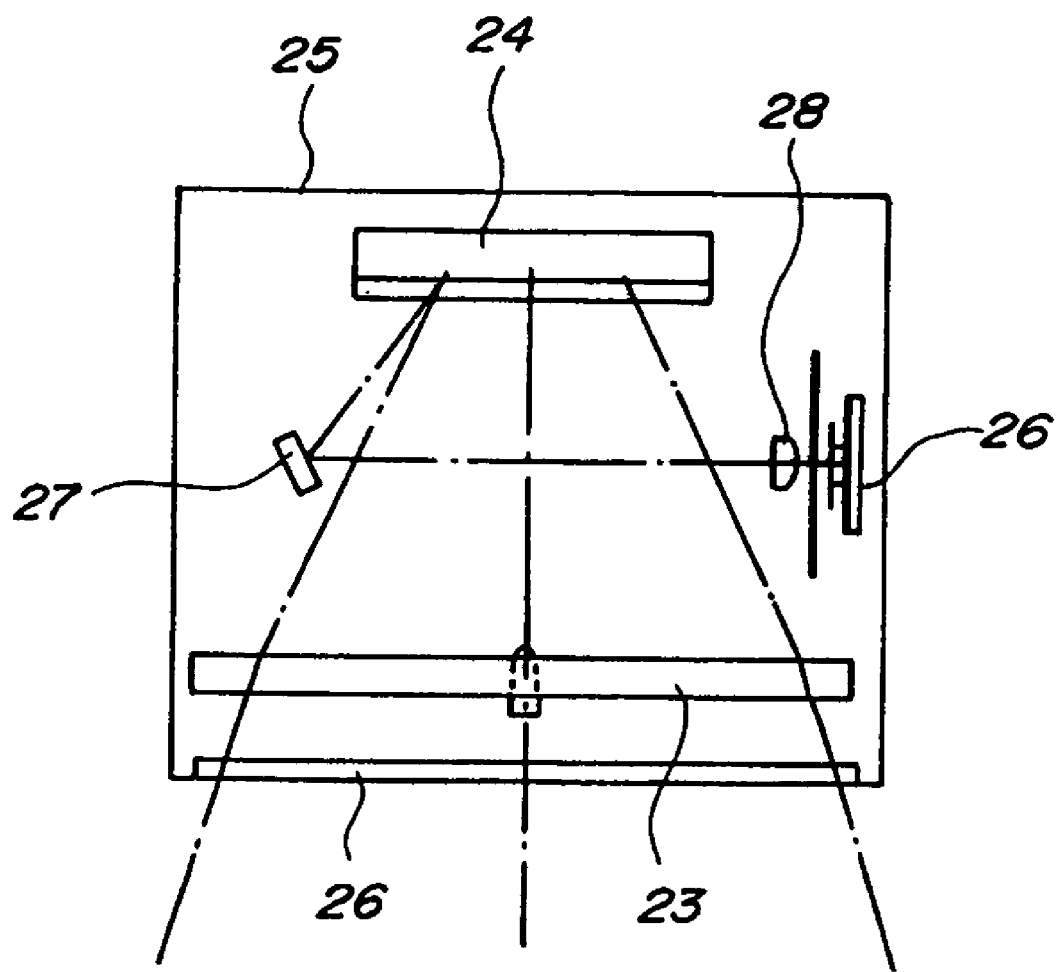

Then, the configuration of the scanning optical device 9 will be described with reference to FIG. 2. The four scanning optical devices of the embodiment are provided corresponding to the image forming stations respectively. All the four scanning optical devices 9 have the same configuration. FIG. 2A is a plan view showing a main part of the scanning optical device 9 when one laser scanning unit is taken out by way of example, and FIGS. 2B and 2C are a side view showing the main part when viewed from directions of arrows A and B respectively.

In FIG. 2, the reference numeral 19 designates a light source unit. The light source unit 19 includes a laser light emitting diode 19a which becomes the light source, a drive electric board 19b for the laser light emitting diode 19a, a collimator lens-barrel 19c, and an opening iris (not shown). The light source unit 19 emits the parallel laser beam.

The reference numeral 20 designates a cylindrical lens having refractive power in a direction perpendicular to the sheet surface. The reference numeral 21 designates a deflection scanning unit which deflects and scans the laser beam, and the deflection scanning unit 21 includes a rotary polygon mirror and a motor unit for the rotary polygon mirror. The reference numeral 22 designates a toric lens which forms the image on the photosensitive drum 2 at a predetermined spot diameter of the laser beam, and the reference numeral 23 designates a diffraction optical element which diffracts the laser beam to form the image on the photosensitive drum 2 at the predetermined spot diameter of the laser beam. The reference numeral 24 designates a reflecting mirror which reflects the light flux.

That is, the light flux from the light source is deflected using the deflection scanning unit, and the photosensitive drum 7 which is of the body to be scanned is irradiated with the light flux through the toric lens 22, diffraction optical element (diffraction member) 23, and reflecting mirror (reflecting member) 24 which are of the optical member. The optical member in the embodiment is a member which performs the light scanning to the body to be scanned by diffracting and reflecting the light flux deflected by the deflection scanning unit.

Each member is accommodated in an optical housing 25, and the photosensitive drum 7 is irradiated with light through a dust-proof glass 26 which is held while being insertable and extractable in a sliding manner.

Figure 3:
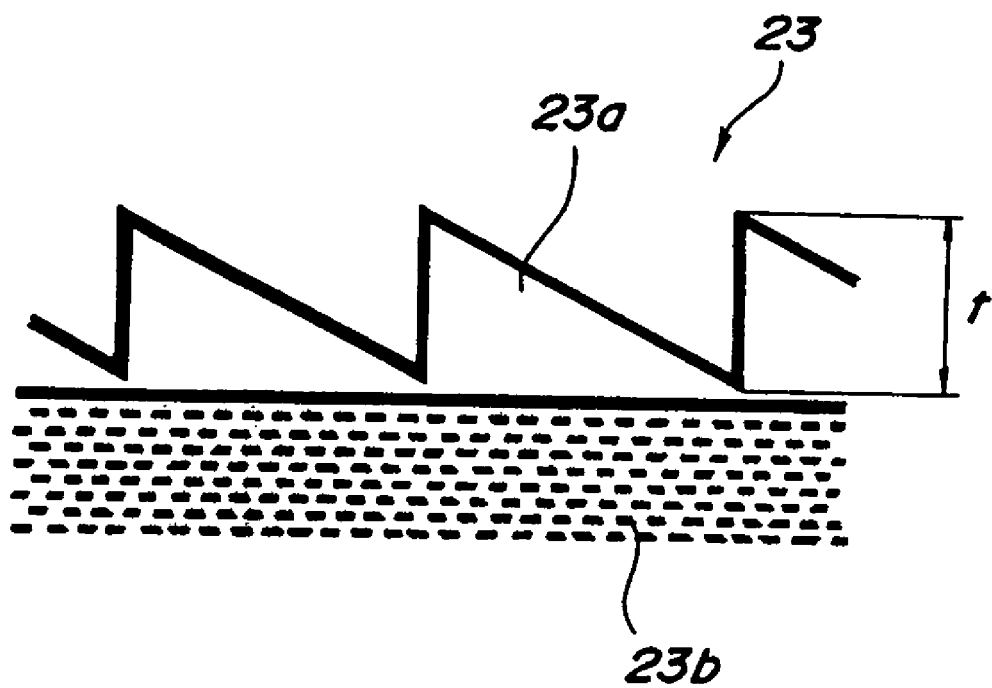
FIG. 3 is an explanatory view showing a diffraction optical element.
Figure 4A:
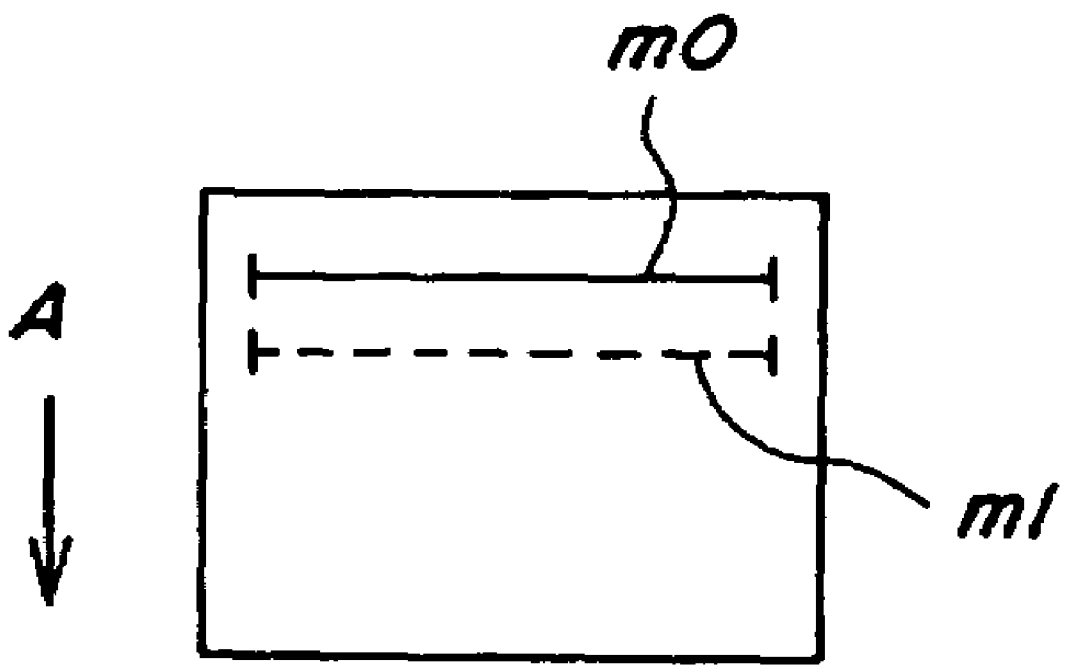
FIGS. 4A to 4E are explanatory views showing image position shift when a latent image is written in a photosensitive drum.
Figure 4B:
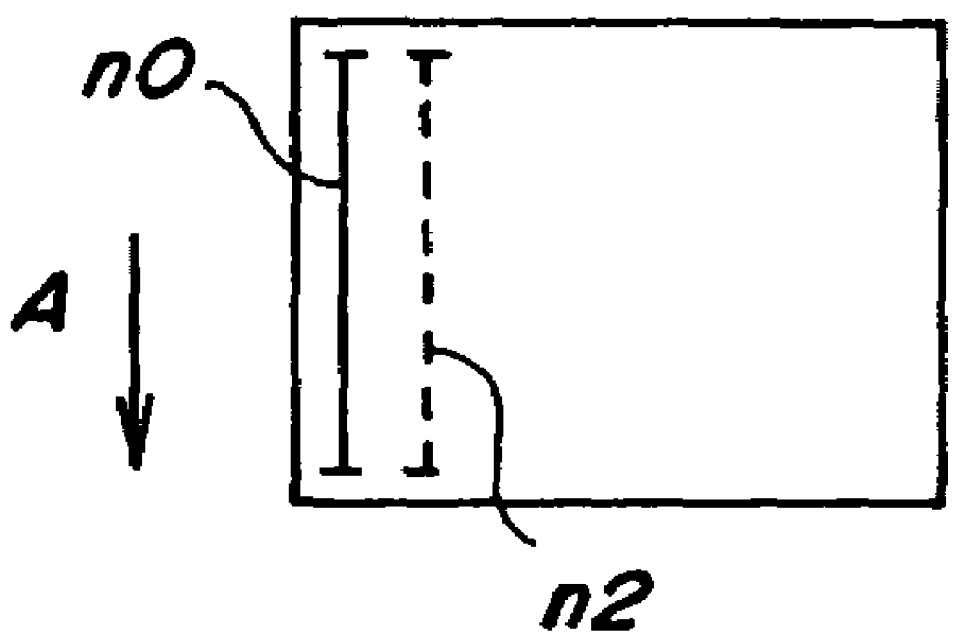
Figure 4C:
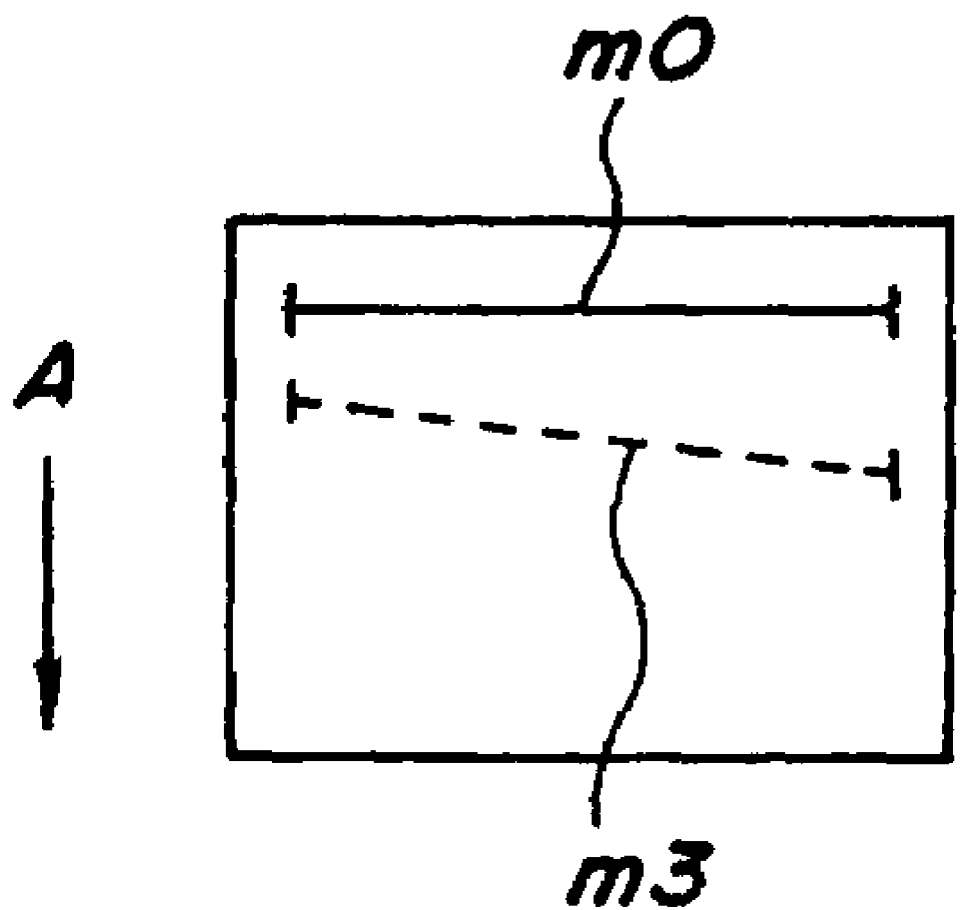
Figure 4D:
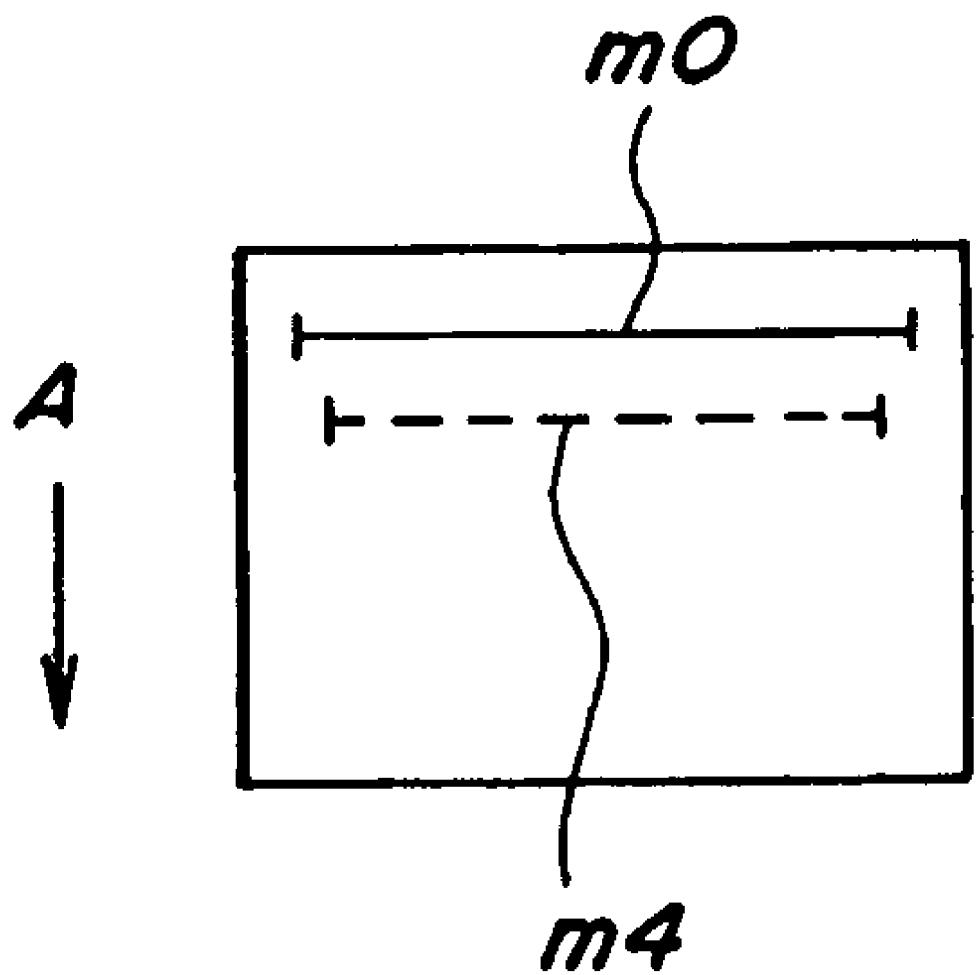
Figure 4E:
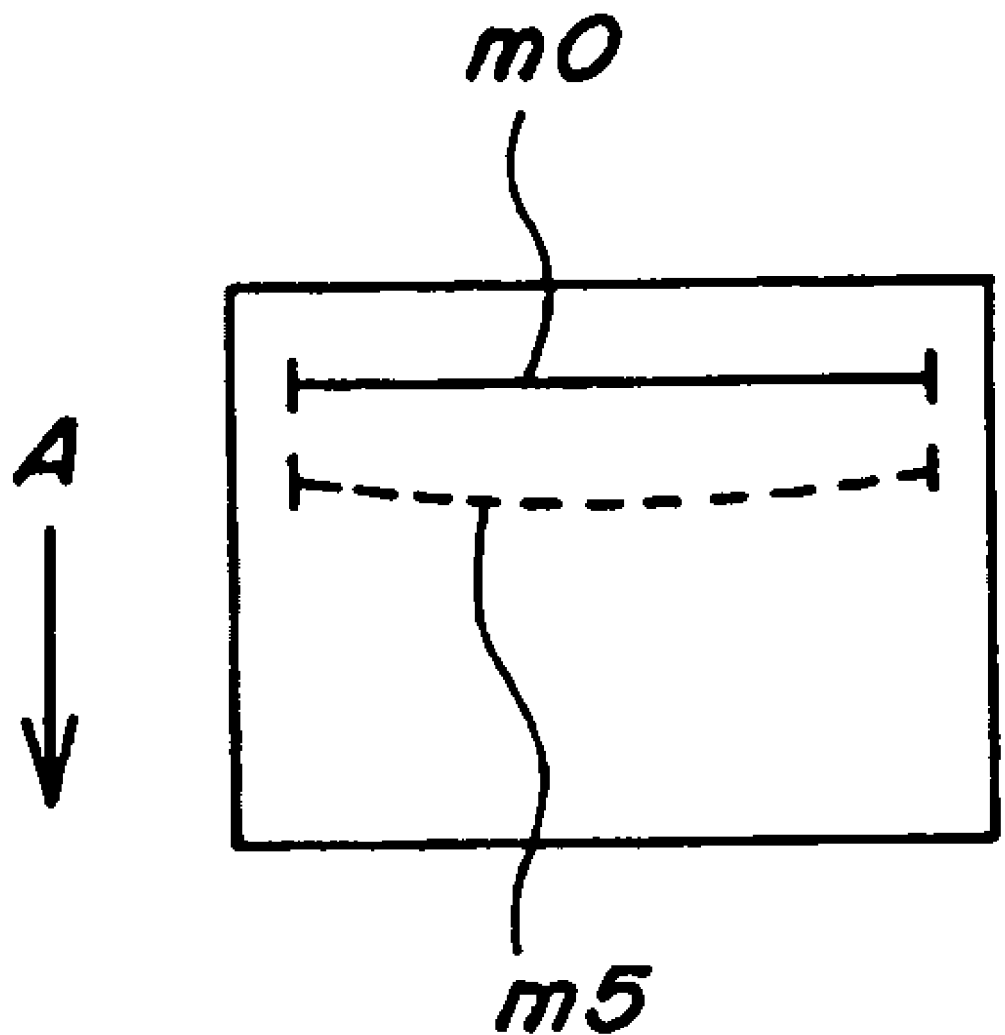

In the embodiment, as described later, the position of the diffraction optical element 23 can be adjusted in the optical member. As shown in FIG. 3A, in the diffraction optical element 23 of the embodiment, an ultraviolet curing resin is applied on the surface of a base material 23a to form a layer 23b having a grating thickness t in the resin portion. In the grating thickness t, diffraction efficiency of first-order diffraction light becomes 100% at a wavelength of 530 nm. The diffraction optical element 23 may be configured such that the plural diffraction gratings are laminated to form a multi-layer.

In FIG. 2, the reference numeral 26 designates a beam detector which detects laser beam writing timing (synchronous signal) in each one line on the photosensitive drum. The reference numeral 27 designates a reflecting mirror which reflects the light flux to the beam detector 26, and the reference numeral 28 designates an image-formation lens which focuses the light flux on to the reflecting mirror 27. The diffraction optical element 23 is supported which the rotation adjustment can be performed in a P direction and an R direction shown by arrows in FIGS. 2A and 2B.

Each scanning optical device 9 is attached from above onto a horizontal plane of the apparatus main body 1 or onto a stay having slight inclination, and a laser beam flux path from the light source unit 19 to the reflecting mirror 27 through the rotary polygon mirror 21 is arranged horizontally or with slight inclination. When scanning optical devices (laser scanning unit) 1a to 1d are attached onto the stay, the position of each scanning optical device is changed on the stay to perform initial adjustment such that irradiation position on the corresponding photosensitive drum 7 becomes a predetermined position, and the scanning optical device is secured with four screws (not shown).

(Position Adjusting Unit)

In the embodiment, the configuration of the position adjusting unit which is of the swing unit will be described.

The position adjusting unit which adjusts the image position where the latent image is written in the photosensitive drum 7 will be described. The position adjusting unit adjusts the image positions of the yellow Y, magenta M, and cyan C based on the image position of the black K with respect to the shift of each parameter shown in FIGS. 4A to 4E. In FIG. 4, an arrow A indicates an image conveyance direction, and the direction orthogonal to the arrow A is the light scanning direction by the scanning optical device 9.

The adjustments for vertical margin shift (see FIG. 4A) and horizontal margin shift (see FIG. 4B) are performed by changing the laser writing timing of the laser diode 19a, which is of the laser light emitting unit, by necessary amount. The adjustment for magnification shift (see FIG. 4D) is performed by changing the modulation frequency, at which the laser diode 19a is modulated, by a predetermined amount. The above three items can be relatively easily adjusted by changing the electric synchronous timing and the frequency.

However, for inclination shift (see FIG. 4C) and scanning line bend (see FIG. 4E), a large-scale and expensive configuration is required to similarly perform the adjustment using the image signal. Therefore, in the embodiment, the adjustments for the inclination shift and scanning line bend are performed by changing the inclination of the diffraction optical member as described later.

As shown in FIG. 2, in the embodiment, the diffraction optical element 23 which is of the diffraction optical member is bonded and fixed onto the substantially central portion in a longitudinal direction of a holding member 29 formed by aluminum die-casting or the like. Thus, the optical unit includes the diffraction optical element 23 and the holding member 29. The both end portions of the diffraction optical element 23 are pressed against the holding member 29 by applying a force by springs which are of an elastic member in order to prevent the deformation of the diffraction optical element 23, which is caused by the difference in linear expansion coefficient between the diffraction optical element 23 and the holding member 29.

An attitude of the diffraction optical element 23 and the inclination adjusting configuration will be described below. In the inclination adjustment, the adjustment is performed by swinging the diffraction optical element 23 in the plane orthogonal to the optical axis of the diffraction optical element 23. In FIG. 2, the reference numeral 30 designates a swing axis provided in the holding member 29, and the swing axis 30 becomes the swing center of the diffraction optical element 23. The reference numeral 31a designates a pulse motor which controls the swing amount of holding member, and a screw is formed in an output shaft of the pulse motor 31a. A slide member 34 in which an internal thread is formed is threadably mounted on the screw, and the slide member 34 is moved in a Z direction. The slide member 34 is of a swing member which swings the holding member. The movement of the slide member 34 swings the diffraction optical element 23 in the P direction about the swing axis in the plane orthogonal to the optical axis. Thus, the inclination adjustment (correction) is performed by swinging the diffraction optical element 23 in the P direction.

The reference numeral 32a designates a compression spring which presses a pulse-motor facing surface of the holding member 29 onto the side of the pulse motor 31a. The other side of the holding member 29 is pressed against the fixed portion such as a wall surface of the optical housing 25. The reference numeral 33a designates a viscoelastic member which becomes an abutting unit. The viscoelastic member 33a is pressed against a side wall of the holding member 29 from the direction substantially orthogonal to the swing direction of the holding member 29. The viscoelastic member 33a can be moved in the direction of an arrow X of FIG. 2A, and the viscoelastic member 33a can abut on and be separated from the end portion of the holding member 29.

Then, the configuration which adjusts the bend of the attitude of the diffraction optical element 23 will be described. In the bend adjustment, an angle between the diffraction optical element 23 and the laser beam incident to the diffraction optical element 23 is adjusted by changing the inclination of the diffraction optical element 23. That is, the inclination is changed in the plane orthogonal to the optical axis of the diffraction optical element 23 with respect to the vertical direction in the image forming apparatus. In the embodiment, the inclination of the swing axis 30 is changed with respect to the vertical direction in the image forming apparatus. As shown in FIG. 2B, one end side 30a of the swing axis 30 is pressed against the fixed portion of the optical housing 25 by a plate spring (not shown) or the like. The other end side 30b can be moved in a Y direction by a lift member 31b. Therefore, the diffraction optical element 23 can be swung in the direction of the arrow R about the one end side 30a of the swing unit, which allows the bend adjustment (correction) to be performed. Even if the relationship holds reversely between the pressed side 30a and the moved side 30b of the swing axis 30, the diffraction optical element 23 can similarly be swung in the R direction. A force applying member 32b which presses the swing axis 30 against the lift member 30b is provided in a lift member facing portion of the swing axis 30.

(Abutting Unit)

In the embodiment, during the image formation, the holding member 29 of the scanning optical device 9 is held down to suppress the vibration of the holding member 29 by abutting unit 33 which is of a vibration suppression unit. Then, the configuration which holds down the holding member 29 will be described.

Figure 5A:
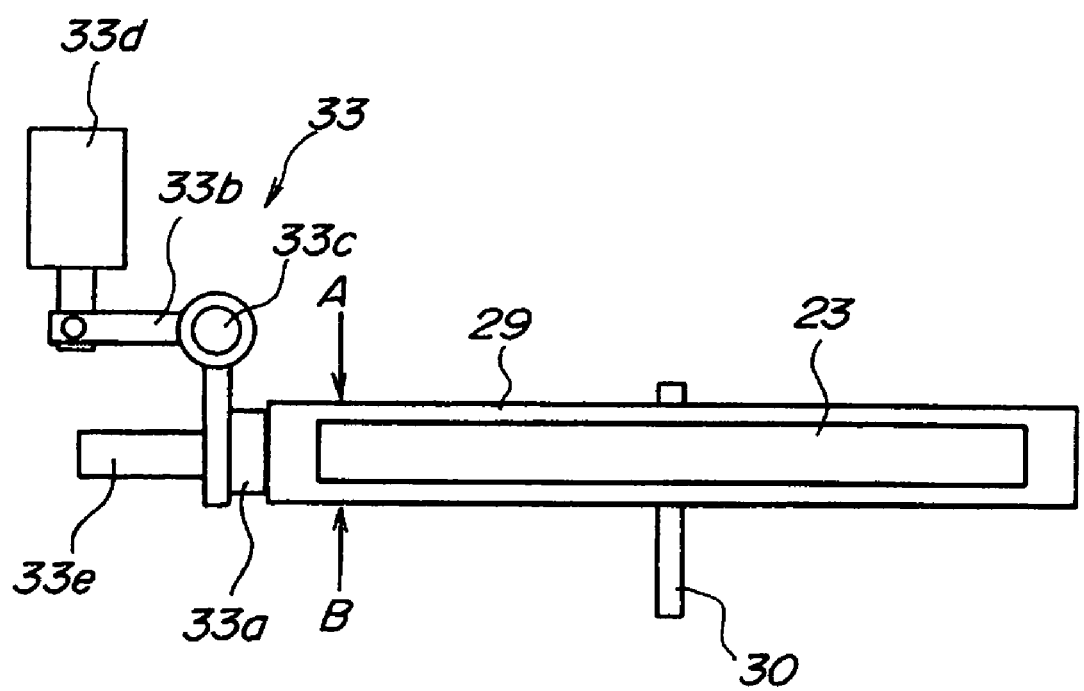
FIG. 5A is an explanatory view showing an abutting unit
Figure 5B:
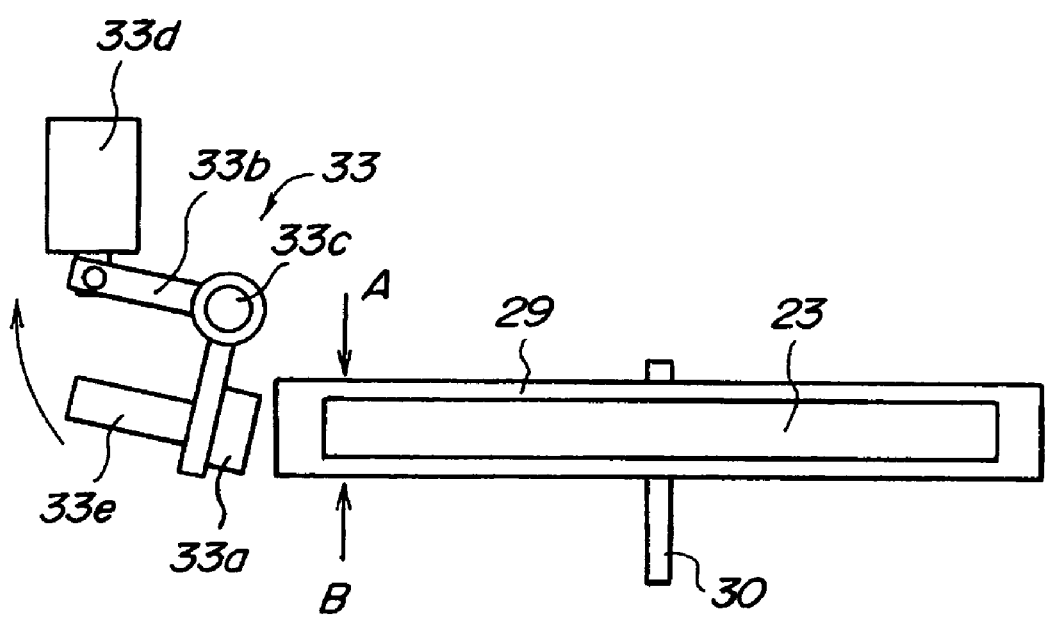
FIG. 5B is an explanatory view showing the abutting unit.

As shown in FIGS. 5A and 5B, the viscoelastic member 33a which is of the abutting unit can abut on and be separated from one end in the longitudinal direction of the holding member 29. On the other end where the viscoelastic member 33a is not attached, the adjusting unit which adjusts the inclination of the diffraction optical element 23 is attached while being in contact with the other end. The viscoelastic member 33a is made of rubber having a viscoelastic property. The viscoelastic member 33a is bonded and fixed onto one end side of a lever 33b which is bent in an L-shape, or the viscoelastic member 33a is bonded to one end side of the lever 33b with a double-faced tape. The lever 33b is fitted to a swing axis 33c at a bent position, and a solenoid 33d is attached to an end portion located across the swing axis 33c from the bonding portion to which the viscoelastic member 33a is attached. Thus, one end of the support member is fixed by the adjusting unit while the viscoelastic member is attached to the other end. Therefore, the end portion of the diffraction optical element can be prevented from vibrating by fixing the both end portions, even if the rotation axis is arranged at the substantially central portion in the longitudinal direction of the support member in swinging the support member along the plane orthogonal to the optical axis.

In the lever 33b, a compression spring 33e which presses the viscoelastic member 33a against the holding member 29 is attached to the opposite surface to the surface to which the viscoelastic member 33a is bonded. The solenoid attachment portion, the swing axis 33c, and the pressed surface opposite the lever pressing side of the compression spring 33e are formed while integrated with or separated from the optical housing.

Each shift amount is corrected by computing color shift amounts of the yellow Y, magenta M, and cyan C from the detection signal of the registration mark formed on the intermediate transfer belt 6 based on the black K. However, because the bend change amount caused by temperature rise in the image forming apparatus is extremely small in the embodiment, an automatic adjusting mechanism is not provided and the bend characteristics which are exactly adjusted in assembling the scanning optical device are continuously maintained.

In the embodiment, the abutting unit abuts on the holding member. However, the abutting member may abut on the optical component.

(Adjustment Operation)

In the embodiment, in adjusting the image position where the latent image is written in the photosensitive drum 7, the vertical margin shift, the horizontal margin shift, and the magnification margin shift are electrically corrected, and the inclination adjustment and the bend adjustment are optically corrected.

The detailed inclination adjusting operation will be described below. In the embodiment, the pulse motor 31 is driven at a half step, and one turn of the output shaft is given by 96 pulses. At this point, because a screw pitch is 0.5 mm, a motor slide member 34 is vertically moved by 5.2 µm per one step. In the holding member 29 of the embodiment, the distance from the swing axis 30 of the swing center to the slide member 34 is 170 mm, so that the diffraction optical element 23 is rotated by 0.105 minute per one step in pulse motor. The swing center is provided in the substantial center in the longitudinal direction of the optical unit. That is, the swing center is provided near the substantially central portion in the longitudinal direction of the diffraction optical element 23 such that the linear distance with the optical axis of the diffraction optical element 23, which is located in the central portion of the diffraction optical element 23, is shortened.

In the diffraction optical element 23 of the embodiment, the inclination is changed by 90 μm per one-minute rotation at the distance of 280 mm (distance between the image reading units located on the front and rear sides). Therefore, the inclination adjustment (correction) amount becomes 9.45 μm per one step in the pulse motor 31.

Figure 6:
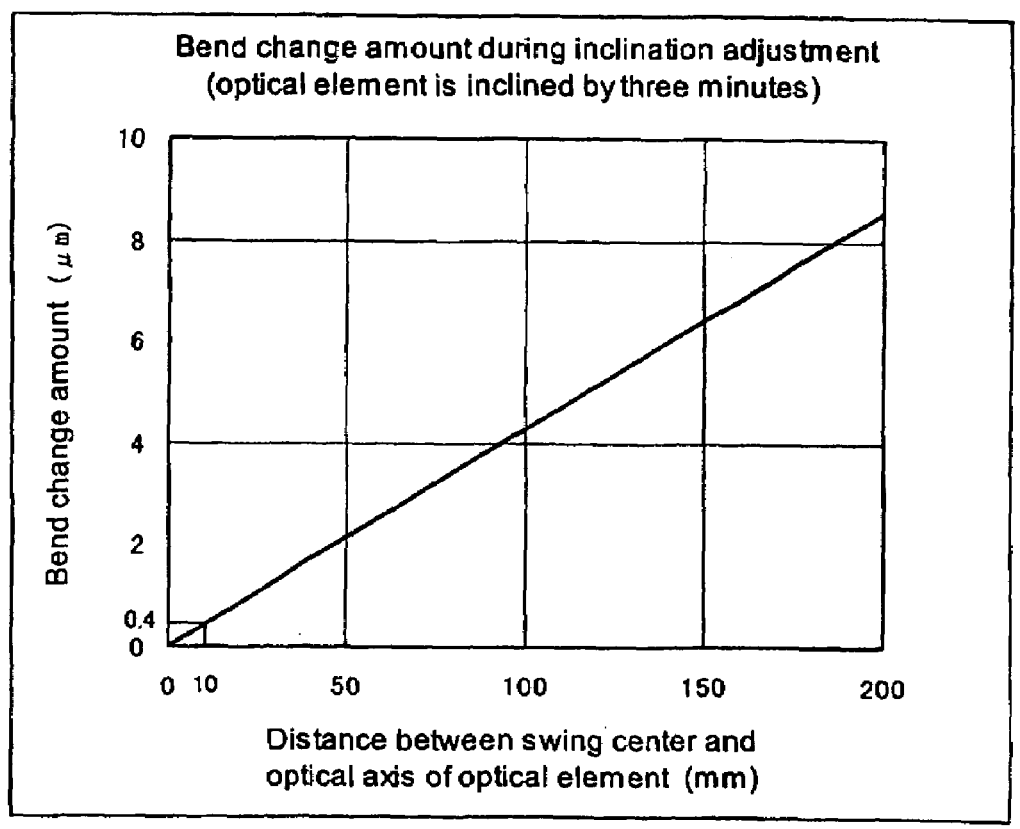
FIG. 6 is a graph for explaining a bend change amount during inclination adjustment.

In the embodiment, because the linear distance between the swing axis 30 and the optical axis of the diffraction optical element 23 is 10 mm, as can be seen from FIG. 6, the bend change amount during the inclination adjustment becomes 0.4 μm per the swing amount of three minutes which does not have an influence on the color shift. For the bend change amount in the tandem type image forming apparatus, allowance of one bend change amount becomes 4 μm, in consideration of the maximum allowance of 8 μm in the color shift caused by the bend component between the two photosensitive drums. Therefore, from the relationship of the bend change amount during the inclination adjustment of FIG. 6, it is preferable that the linear distance between the swing axis and the optical axis of the diffraction optical element be more than 0 mm and not more than 90 mm. In each of the scanning lines of the yellow Y, magenta M, and cyan C, it is found that the relative inclination change not lower than 250 μm is generated with time by the temperature rise of the image forming apparatus including the scanning optical device based on the scanning line of the black K. Therefore, it is necessary that the diffraction optical element be rotated by about three minutes in order to correct the inclination change with time.

As a result of the computation from the detection signal of the registration mark, the predetermined number of pulses is given to the pulse motor based on the adjustment amount.

Timing at which the registration mark is formed on the intermediate transfer belt 6, timing at which the registration mark is read, and timing at which the pulse motor 31 is driven may be triggered by starting up a particular mode while the image is not formed or may be adjusted between the image formation and the image formation.

The electric current is not passed through the solenoid 33*d* during the image formation, the registration mark formation, and a nonoperating state of the image forming apparatus. Therefore, as shown in FIG. 5A, the viscoelastic member 33*a* abuts on the end portion of the holding member 29 while the viscoelastic member 33*a* is pressed against the end portion by the force applied by the compression spring 33*e*.

The electric current is passed through the solenoid 33*d* at the same time when the pulse signal for driving the pulse motor 31 is given to adjust the position of the holding member 29. That is, in the embodiment, when the position of the holding member 29 is adjusted, the lever 33*b* is automatically drawn and rotated in the clockwise direction in FIG. 5A by the above-mentioned separating unit, and the viscoelastic member 33*a* is separated from the holding member 29 as shown in FIG. 5B. After the pulse signal is given, the electric current is not passed through the solenoid 33*d* again, and the viscoelastic member 33*a* abuts on the end portion of the holding member 29 while the viscoelastic member 33*a* is pressed against the end portion by a force applied by the compression spring 33*e*. Thus, the viscoelastic member 33*a* abuts on and is separated from the holding member 29 in association with the drive of the pulse motor 31 constituting the position adjusting unit.

In starting the swing of the diffraction optical element 23, there is no trouble even if the diffraction optical element 23 is deformed. Therefore, the timing of starting the passage of the electric current through the solenoid 33*d* may not be adjusted at the same time when the pulse signal is given, but the timing may become slightly delayed or faster. No trouble is functionally generated when the electric current is not passed through the solenoid 33*d* only during the image formation and the registration mark formation.

The vibration is effectively suppressed when the direction in which the viscoelastic member 33*a* abuts on the holding member 29 is set at the direction orthogonal to the swing direction of the holding member 29. Therefore, in the embodiment, the viscoelastic member 33*a* abuts on the holding member 29 in the longitudinal direction of the holding member 29 as shown in FIG. 5A. However, the direction in which the viscoelastic member 33*a* abuts on the holding member 29 may be set at the direction of the arrow A of FIG. 5A or the direction of the arrow B.

Thus, because the viscoelastic member 33*a* abuts on the end portion of the holding member 29 during the image formation, the vibration of the holding member 29 is suppressed even if rigidity of the holding member 29 is enhanced. The abutment and separation of the viscoelastic member 33*a* are performed similar to the bend adjustment and the inclination adjustment. That is, the viscoelastic member 33*a* is separated when the diffraction optical element is swung.

Usually the swing adjustment of the holding member 29 is performed to adjust the position of the diffraction optical element 23 in the time except for the image formation. The swing adjustment of the holding member 29 becomes the shortest when the swing adjustment is performed during the interval between the image formation and the image formation (so-called sheet-to-sheet interval during continuous image formation).

In the image forming apparatus of the embodiment, the time interval between the sheets is about 150 ms during the image formation, and the time necessary for the inclination adjustment of the diffraction optical element 23 is about 50 ms. At this point, the maximum color shift of 30 μm caused by the inclination shift is permitted, so that the end portion on the drive side of the holding member is displaced by 17 μm (□30/9.45×5.2) at the maximum to correct the color shift. The end portion on the free end side is similarly displaced by about 17 μm when the swing center of the diffraction optical element 23 is set at the substantial center of the holding member 29. As the swing center is brought close to the end portion on the drive side, the displacement on the free end side is increased.

As described above, because the inclination change amount caused by the temperature rise in the image forming apparatus relatively becomes not lower than 250 μm, sometimes the inclination adjusting unit is displaced within the range of about 150 μm on the drive side of the holding member 29 mainly in the initial state.

For the viewpoint of bend generated by the distortion, it is necessary that the residual distortion on the free end side of a holding member 29, which is caused by applying the force to the holding member 29 with the viscoelastic member 33*a*, be kept to about 5 μm, i.e., not more than one-thirds of the maximum displacement. At this point, the force applied in the swing direction becomes not more than 50 gf. After the inclination adjustment, because the time of 100 ms remains before the next image formation, it is necessary that the restoring force in the shearing direction of the viscoelastic member 33*a* become not more than 50 gf before the next image formation. The viscoelastic member 33*a* may not be made of the rubber as long as the material has the above characteristics. For example, the viscoelastic member 33*a* may be made of a urethane foam material, silicone rubber, and an elastomer.

The viscoelastic member may be attached to the portion such as the holding member and the optical component at which the viscoelastic member abuts on the abutting unit.

In the embodiment, the solenoid 33*d* is used as the mechanism which causes the viscoelastic member 33*a* to abut on and separates the viscoelastic member 33*a* from the holding member 29 by way of example. However, for example, the mechanism can be realized by a combination of the pulse motor and a cam.

In the swing unit for the holding member 29 of the embodiment, the slide member 34 (see FIG. 2A) is pressed against one surface side of the holding member 29 and the compression spring applies the force to the other surface side. However, the slide member 34 may be formed so as to clamp the holding member 29, and the slide member 34 may be formed such that the holding member 29 follows the slide member 34 with no backlash.

Figure 7:
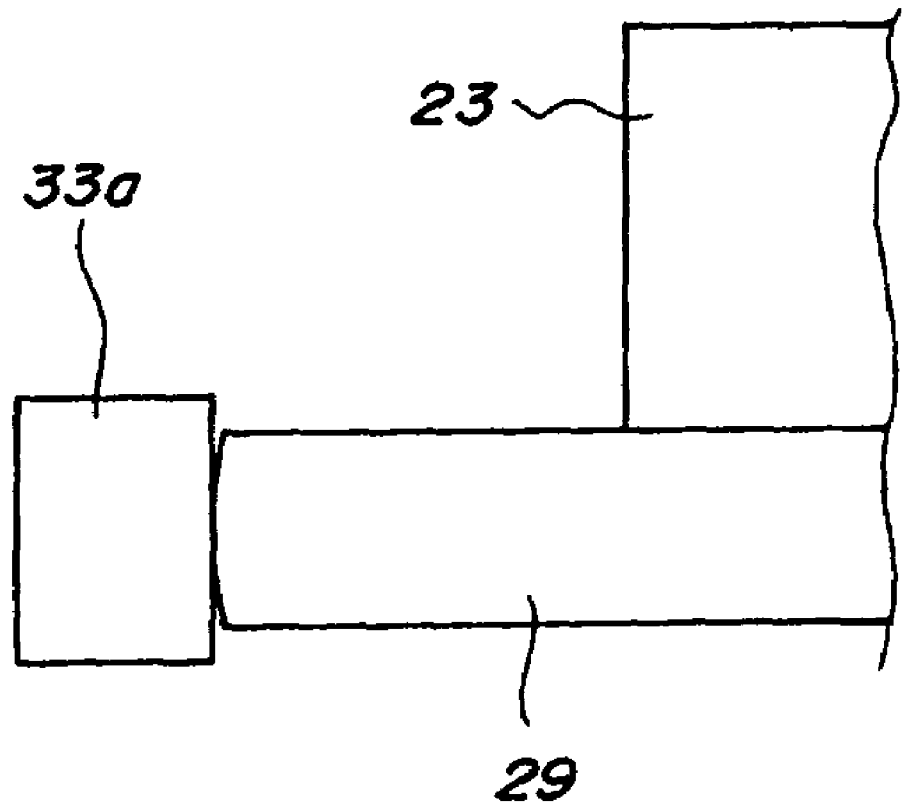
FIG. 7 is an explanatory view showing an end portion shape of a holding member.

As shown in FIG. 7, preferably the shape of the surface on which the viscoelastic member 33a of the holding member 29 abuts on is formed so as to have the curvature along the swing direction of the holding member 29. Therefore, the deformation can further be suppressed against the pressing force because the viscoelastic member 33a abuts initially on the substantial center in the thickness direction of the holding member 29 irrespective of the attitude of the holding member 29. Particularly, the deformation can be suppressed more effectively when a curvature radius is equalized to the distance from the swing center to the surface in which the holding member 29 abuts on the viscoelastic member 33a.

Figure 8:
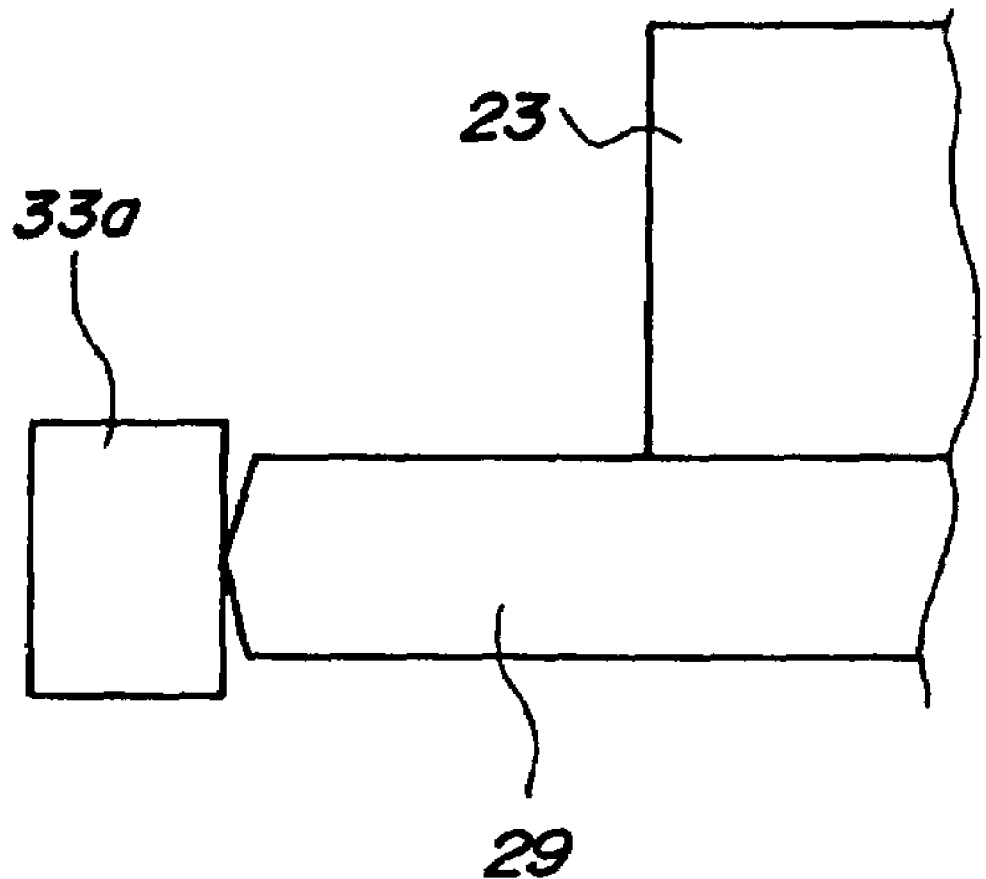
FIG. 8 is an explanatory view showing an end portion shape of the holding member.
Figure 9A:
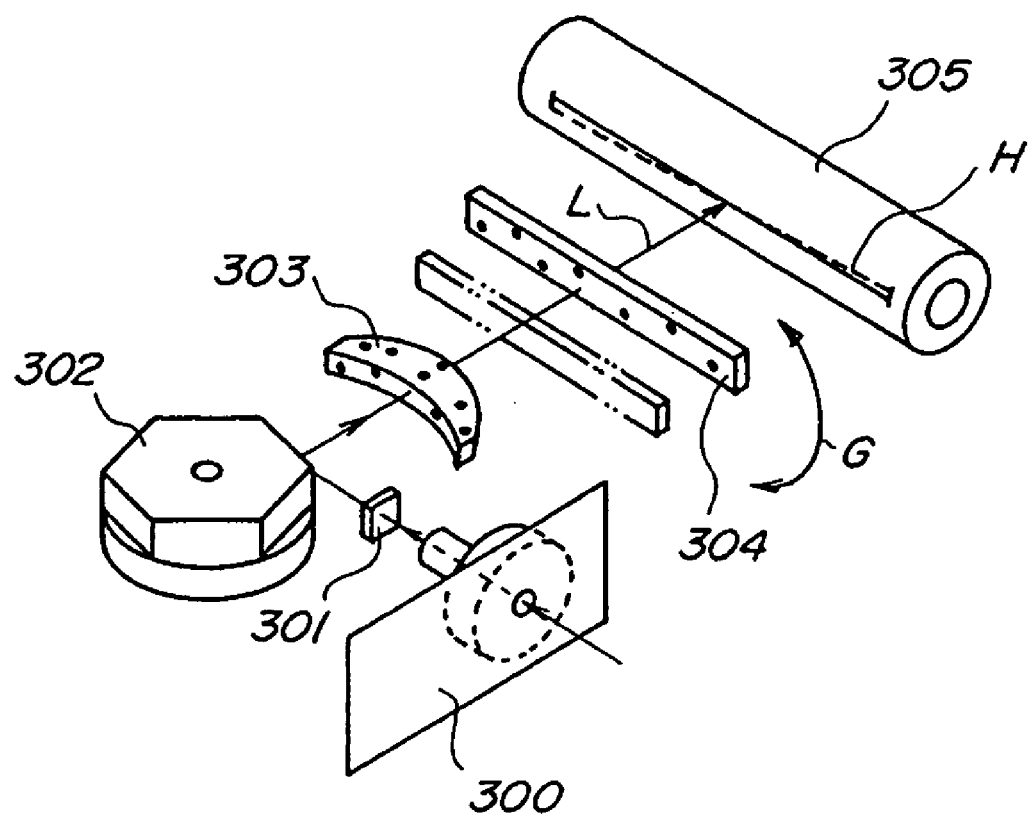
FIGS. 9A and 9B are explanatory views showing a conventional technique.
Figure 9B:
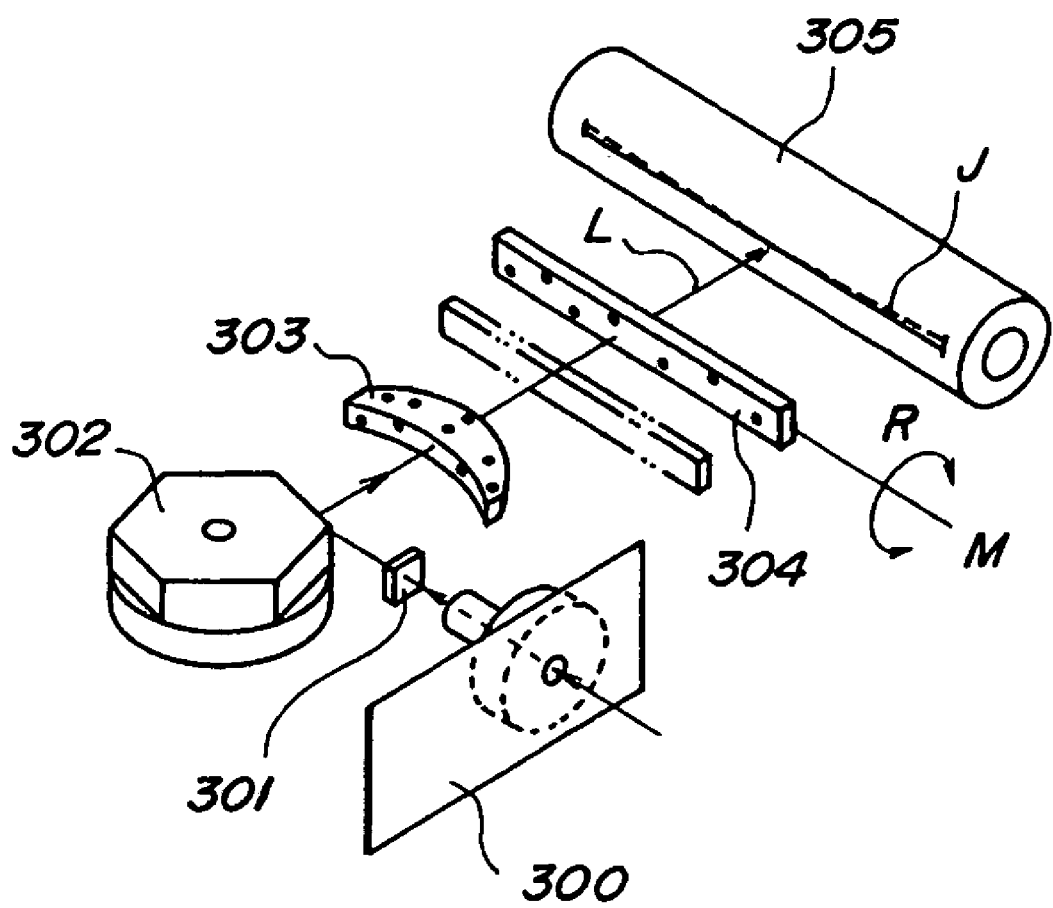
Figure 10:
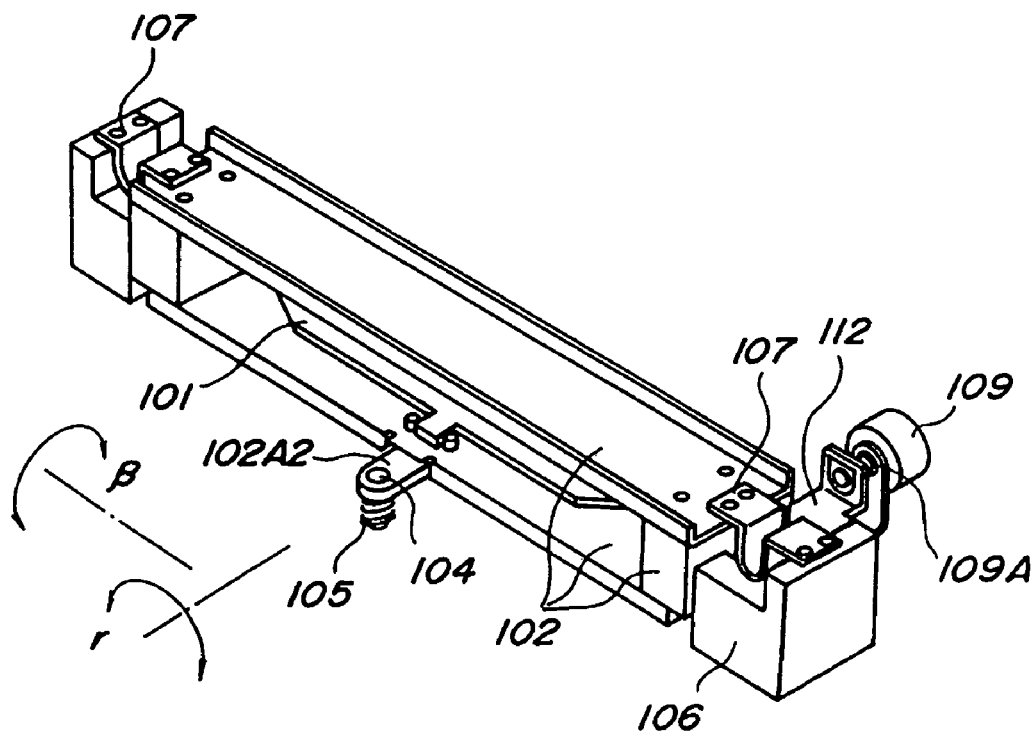
FIG. 10 is an explanatory view showing position adjustment of an optical member according to a conventional technique.
Figure 11:
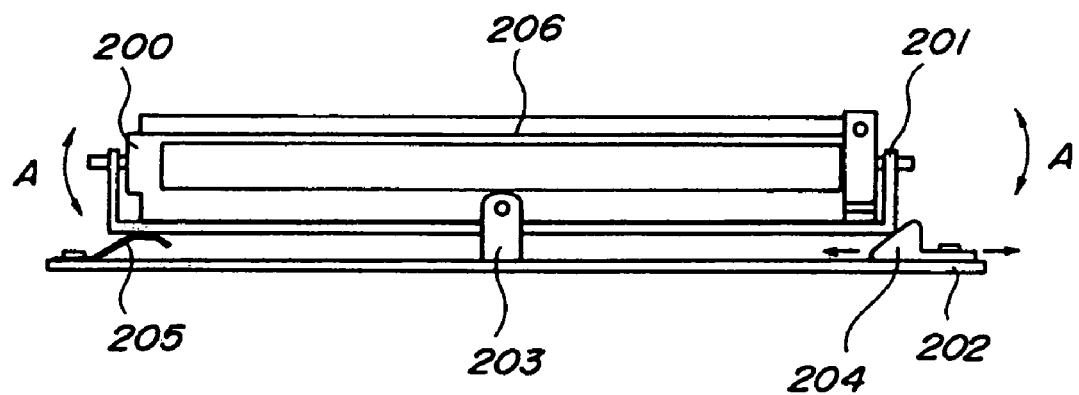
FIG. 11 is an explanatory view showing position adjustment of an optical member according to a conventional technique.

As shown in FIG. 8, the deformation can similarly be suppressed when the surface in which the holding member 29 abuts on the viscoelastic member 33a is formed in an edge shape in which the surface is projected toward the side of the viscoelastic member 33a such that the surface becomes highest at the substantial center in the swing direction of the holding member 29.

As described above, in the embodiment, the position adjusting unit and the force applying unit are provided in the same direction as the swing center with respect to the holding member 29, when the inclination and bend of the scanning line on the surface to be scanned of the photosensitive drum 7 are adjusted by displacing the position of the optical member. This enables the deformation of the image-formation optical element to be suppressed without extremely enhancing the rigidity of the holding member.

The vibration of the optical member can be suppressed by pressing the free end side of the holding member 29 from the direction substantially perpendicular to the swing direction with the viscoelastic member 33a. In swinging the optical member, the viscoelastic member 33a is separated or the restoring force is decreased for the distortion in the shearing direction of the viscoelastic member 33a. Therefore, the deformation of the holding member 29, caused by the shearing force of the elastic body, can be prevented in the scanning optical device. The color image forming apparatus, in which the defective color images such as the color shift and the position sift can be eliminated, can be achieved by forming the color image forming apparatus with the plural scanning optical devices.

In the above embodiment, an example in which the position is adjusted while the diffraction optical element 23 is maintained at the holding member is described. However, the optical member whose position is adjusted is not limited to the diffraction optical element (diffraction member) 23. For example, other optical members such as the reflecting mirror (reflecting member) 24 is configured such that the position can be adjusted, the vibration may be suppressed by causing the optical member to abut on the abutting unit after the position is adjusted. The number of optical members in which the position is adjusted while the vibration is suppressed by causing the abutting unit to abut on is not always limited to one. For example, the diffraction optical element 23 and the reflecting mirror 24 are held by the holding members respectively, and the abutting unit can be caused to abut on the holding members to suppress the vibration.

Although the full-color image forming apparatus in which the plural image forming stations are arranged is illustrated in the embodiment, the scanning optical device in which the vibration of the optical member is suppressed by the abutting unit may be the monochrome image forming apparatus having one image forming station. The invention is not particularly limited to the above embodiment, but various changes and modifications could be made without departing from the technical thought of the invention.

This application claims the benefit of priority from the prior Japanese Patent Application No. 2005-254272 filed on Sep. 2, 2005 the entire contents of which are incorporated by reference herein.

What is claimed is:

1. A scanning optical device comprising:
   a rotating polygon mirror which deflects and scans a laser beam;
   optical means which has a diffraction optical component for orienting the laser beam from the rotating polygon mirror toward a body to be scanned;
   a swing member which acts on one end portion of the optical means to swing the optical means in a plane orthogonal to an optical axis of the diffraction optical component while rotation axis is located near said optical axis;
   vibration suppression means which comes into contact with the other end portion of the optical means to suppress vibration of the optical means; and
   separating means which separates the vibration suppression means when the optical means is swung with the swing member.

2. A scanning optical device according to claim 1, wherein said optical means includes:
   an optical member which scans the laser beam from said rotating polygon mirror to the body to be scanned; and
   a holding member which holds the optical member.

3. A scanning optical device according to claim 1, wherein a distance between said optical axis and said rotation axis is more than 0 mm and not more than 90 mm.

4. A scanning optical device according to claim 1, wherein a viscoelastic member abuts on and is separated from the optical means.

5. A scanning optical device according to claim 1, wherein, in said viscoelastic member, restoring force by shearing distortion becomes not more than 50 gf within 100 ms after said viscoelastic member is deformed in a shearing direction.

6. A scanning optical device according to claim 1, wherein, in said optical means, a surface which comes into contact with said vibration suppression means has a curvature along a swing direction of said optical means.

7. A scanning optical device according to claim 1, wherein the vibration suppression means abuts on an end portion of said optical means from a direction orthogonal to the swing direction of said optical means.

8. A scanning optical device according to claim 1, further comprising a changing means which changes the optical means to change inclination of said plane with respect to a gravity direction,
   wherein the separating means separates said vibration suppression means when the changing operation is performed.

9. An image forming apparatus comprising:
   a plurality of image bearing members; and
   a plurality of scanning optical devices according to claim 1 which expose the image bearing members respectively.

* * * * *